(12) United States Patent
Halsall

(10) Patent No.: US 9,585,801 B2
(45) Date of Patent: Mar. 7, 2017

(54) POWERED MOBILITY DEVICE

(71) Applicant: Kevin Thomas Halsall, Otaki (NZ)

(72) Inventor: Kevin Thomas Halsall, Otaki (NZ)

(73) Assignee: OGO TECHNOLOGY LIMITED, Otaki (NZ)

( * ) Notice: Subject to any disclaimer, the term of this patent is extended or adjusted under 35 U.S.C. 154(b) by 17 days.

(21) Appl. No.: 14/373,354

(22) PCT Filed: Feb. 8, 2013

(86) PCT No.: PCT/NZ2013/000010
§ 371 (c)(1),
(2) Date: Jul. 19, 2014

(87) PCT Pub. No.: WO2014/007657
PCT Pub. Date: Jan. 9, 2014

(65) Prior Publication Data
US 2015/0008051 A1     Jan. 8, 2015

(30) Foreign Application Priority Data
Feb. 9, 2012  (NZ) ......................................... 598120

(51) Int. Cl.
*A61G 5/04* (2013.01)
*B62K 3/00* (2006.01)
*A61G 5/10* (2006.01)

(52) U.S. Cl.
CPC ............. *A61G 5/041* (2013.01); *A61G 5/043* (2013.01); *B62K 3/007* (2013.01); *A61G 2005/1051* (2013.01); *A61G 2005/1089* (2013.01); *A61G 2203/14* (2013.01); *A61G 2203/36* (2013.01); *A61G 2203/42* (2013.01); *A61G 2203/44* (2013.01)

(58) Field of Classification Search
CPC ............ A61G 2203/36; A61G 2203/42; A61G 2005/1051; B62K 3/007
USPC ......................................... 180/6.6, 220, 218
See application file for complete search history.

(56) References Cited

U.S. PATENT DOCUMENTS

| | | | |
|---|---|---|---|
| 6,543,564 B1 * | 4/2003 | Kamen | A61G 5/04 180/327 |
| 7,004,271 B1 * | 2/2006 | Kamen | B62D 37/00 180/21 |
| 7,083,019 B2 * | 8/2006 | Chiou | A61G 5/045 180/330 |
| 8,684,398 B1 * | 4/2014 | Nyitray | A61G 5/10 280/250.1 |

(Continued)

*Primary Examiner* — Tony Winner
(74) *Attorney, Agent, or Firm* — Inventa Capital PLC

(57) ABSTRACT

A mobility device includes at least two drive wheels mounted on a shaft; a drive controller drivingly coupled to the shaft; a seat mounted to a tilt mechanism such that the seat is able to tilt in a forward, backward, left and right directions as a result of the user shifting their body weight in either of those directions; a weight displacement sensor connectable to the tilt mechanism and the drive controller such that upon sensing a weight displacement of a user in a particular direction the weight displacement sensor causes the drive controller to impart drive to the drive wheels to move the mobility device in the direction of the sensed displaced weight of the user so that the mobility device is able to be driven in a forward and backward direction and steered in a left or right direction.

30 Claims, 4 Drawing Sheets

(56) References Cited

U.S. PATENT DOCUMENTS

| | | | |
|---|---|---|---|
| 2009/0000850 A1* | 1/2009 | Hornick | A61G 5/043 180/316 |
| 2010/0070132 A1* | 3/2010 | Doi | B60L 15/20 701/36 |
| 2010/0071984 A1* | 3/2010 | Doi | B62K 3/007 180/218 |
| 2011/0010066 A1* | 1/2011 | Fuwa | B62K 3/007 701/70 |
| 2011/0067939 A1* | 3/2011 | Takenaka | B62K 3/007 180/21 |
| 2011/0303475 A1* | 12/2011 | Kim | B62K 3/007 180/218 |

* cited by examiner

POWERED MOBILITY DEVICE

FIELD OF THE INVENTION

The invention relates to a Powered Mobility Device, typically a powered wheelchair, that is able to be steered with or without the use of hands

BACKGROUND OF INVENTION

A problem with existing mobility devices such as wheelchairs is that they are not easily operable by a user, especially those users that have significant loss or impaired movement of their limbs (arms and legs).

Also most wheelchairs are not suitable to be used on all surface types. They are not able to be used easily or effectively on soft surfaces such as lawns or undulating surfaces, i.e. they are not able to be used "off road". They are prone to get stuck and require assistance of others to be able to go "off road".

Powered wheelchairs typically require hand controls to steer and propel the wheel chair forward and backward. It is known to have wheel chairs that are controlled by the weight placement of the user, however these are not suitable for providing fine control of such movement in places where required (such as a crowded place or in a shop) or are not suitable for "off road" use.

PRIOR REFERENCES

All references, including any patents or patent applications cited in this specification are hereby incorporated by reference. No admission is made that any reference constitutes prior art. The discussion of the references states what their authors assert, and the applicants reserve the right to challenge the accuracy and pertinency of the cited documents. It will be clearly understood that, although a number of prior art publications may be referred to herein; this reference does not constitute an admission that any of these documents form part of the common general knowledge in the art, in New Zealand or in any other country.

DEFINITIONS

It is acknowledged that the term 'comprise' may, under varying jurisdictions, be attributed with either an exclusive or an inclusive meaning. For the purpose of this specification, and unless otherwise noted, the term 'comprise' shall have an inclusive meaning—i.e. that it will be taken to mean an inclusion of not only the listed components it directly references, but also other non-specified components or elements. This rationale will also be used when the term 'comprised' or 'comprising' is used in relation to one or more steps in a method or process.

Object of the Invention

It is an object of the invention to provide a Powered Mobility Device, typically a powered wheelchair, that ameliorates some of the disadvantages and limitations of the known art or at least provide the public with a useful choice.

SUMMARY OF INVENTION

In a first aspect the invention resides in a powered mobility device, typically a powered wheelchair, that is able to be steered with or without the use of hands, wherein the powered mobility device includes:
  (i) at least two drive wheels mounted on a shaft;
  (ii) a drive control means drivingly coupled to the shaft;
  (iii) a seat mounted to a tilt mechanism such that the seat is able to tilt in a forward, backward, left and right directions as a result of the user shifting their body weight in either of those directions;
  (iv) a weight displacement sensing means connectable to the tilt mechanism and the drive control means such that upon sensing a weight displacement of a user in a particular direction the weight displacement sensing means causes the drive control means to impart drive to the drive wheels to move the mobility device in the direction of the sensed displaced weight of the user so that the mobility device is able to be driven in a forward and backward direction and steered in a left or right direction;
  (v) a tilt locking means adapted to lock the tilt mechanism such that the seat is unable to be tilted; and
  (vi) a hand control means selectively engageable with the tilt mechanism and the weight displacement sensing means such that the hand control means is adapted to disengage left and right movement of the tilt mechanism so that the hand control means when moved left or right causes the weight displacement sensing means to cause the drive control means to steer the mobility device in a desired direction.

Preferably, the mobility device has only two wheels.

Preferably, the weight displacement sensing means upon sensing weight displacement in a forward direction is adapted to cause the drive control means to impart drive to the wheels such that the mobility device moves in a forward direction.

Preferably, the weight displacement sensing means upon sensing weight displacement in a backward direction is adapted to cause the drive control means to impart drive to the wheels such that the mobility device moves in a backward direction.

Preferably, the speed of the mobility device is controlled by the forward and backward movement of the user and is dependent upon the greater rate of the shift of displaced weight sensed in a particular direction.

Preferably, the weight displacement sensing means upon sensing movement of the user or the hand control means in a left direction causes the drive control means to steer the mobility device to the left.

Preferably, the weight displacement sensing means upon sensing movement of the user or the hand control means in a right direction causes the drive control means to steer the mobility device to the right.

Preferably, the degree of turn of the mobility device is controlled by the degree of left and right movement of the user such that the greater extent of the left or right movement sensed by the weight displacement sensing means the tighter the left or right able to be achieved.

Preferably, the seat is releasably mounted to the tilt mechanism by a mounting means such that the seat is able to be removed when required in order to undertake maintenance of the mobility device or replace the seat with another.

Preferably, the mounting means is of a cam locking type arrangement such that a cam member is able to rotate so that cam member is able to be rotated to engage or disengage with a portion of the tilt mechanism such that when in the engaged position the cam member by engaging with the tilt mechanism secures and locks the seat to the tilt mechanism.

Preferably, the seat has a seat portion, back portion, left side portion and right side portion.

Preferably, the seat and back portion are separate from the left and right side portions such that the seat and back portion is adapted to move independently relative to the left and side right portions, Preferably, the left and right side portions are adapted to be moved laterally so that the width between the left and right side portions can be adjusted in order to accommodate different sized users.

Preferably, the left and right side portions are adapted to be removed so that users are able to be easily loaded on to and unloaded from the mobility device and also allow for easy transport of the wheelchair.

Preferably, the left and right side portions are pivotally mounted to the seat such that they are able to be rotated upwardly and out of the way so that a user can be loaded on to and unloaded from the mobility device.

Preferably, the left and right side portions include armrests.

Preferably, the seat is inclined in a forward direction.

Preferably, the mobility device includes a dampener situated and connected to the tilt mechanism such that the dampener is adapted to control pendulum effects and oversteering effects upon using the mobility device.

Preferably, the dampener is a hydraulic dampener.

Preferably, the dampener includes an adjustable valve so that the dampening effect can be increased or decreased.

Preferably, the mobility device includes foot stands that are able to be raised and lowered such that when in the lowered position the foot stands provide stability to the mobility device of when stationary.

Preferably, the foot stands at the distal ends include castor wheels.

Preferably, there is a forwardly extending foot stand and a rearwardly extending foot stand, each foot stand being connected to a hand lever.

Preferably, the hand control means is a joystick that extends forwardly in front of the seat such that a user is able to, when desired, control the steering of the mobility device by hand.

Preferably, a joystick is releaseably engageable with the tilt mechanism and the weight displacement sensing means such that when the joystick is pulled upwards and towards a user in the seat the joystick is adapted to disengage the tilt mechanism from the weight displacement sensing means so that the joystick when moved left or right is able to steer the mobility device in the desired direction.

Preferably, the joystick is adapted to provide finer control and steering of the mobility device than is possible by steering with the tilt mechanism.

Preferably, the mobility device includes mudguards extending over and above the wheels.

Preferably the rims of the wheels includes handgrips such that when desired a user can manoeuvre the mobility device by hand.

Preferably, the mobility device is a wheelchair.

Preferably, the mobility device is a two wheeled wheelchair.

In a second aspect the invention resides in a two wheeled powered wheel chair, that is able to be steered with or without the use of hands, wherein the powered mobility device includes:

(i) two drive wheels mounted on a shaft;
(ii) a drive control means drivingly coupled to the shaft;
(iii) a tiltable seat such that the seat is adapted to tilt in a forward, backward, left and right directions as a result of a user shifting their body weight in either of those directions;
(iv) a sensing means connectable to the seat and the drive control means such that upon sensing a movement of a user in a particular direction the sensing means causes the drive control means to impart drive to the drive wheels to move the mobility unit in the sensed direction so that the mobility device is able to be driven in a forward and backward direction and steered in a left or right direction;
(v) a seat locking means adapted to lock the seat such that the seat is unable to be tilted; and
(vi) a hand control means selectively engageable with the seat and the sensing means such that the hand control means is adapted to disengage left and right movement of the seat so that the hand control means when moved left or right causes the sensing means to cause the drive control means to steer the mobility device in a desired direction.

Any other aspects herein described

BRIEF DESCRIPTION OF THE DRAWINGS

The invention will now be described, by way of example only, by reference to the accompanying drawings.

DESCRIPTION OF THE PREFERRED EMBODIMENT(S)

The following description will describe the invention in relation to preferred embodiments of the invention, namely a powered mobility device, typically a powered wheelchair, that is able to be steered with or without the use of hands The invention is in no way limited to these preferred embodiments as they are purely to exemplify the invention only and that possible variations and modifications would be readily apparent without departing from the scope of the invention.

The mobility device shown in the figures is to a preferred, but not limiting, embodiment of a wheelchair 10.

Figure 1:
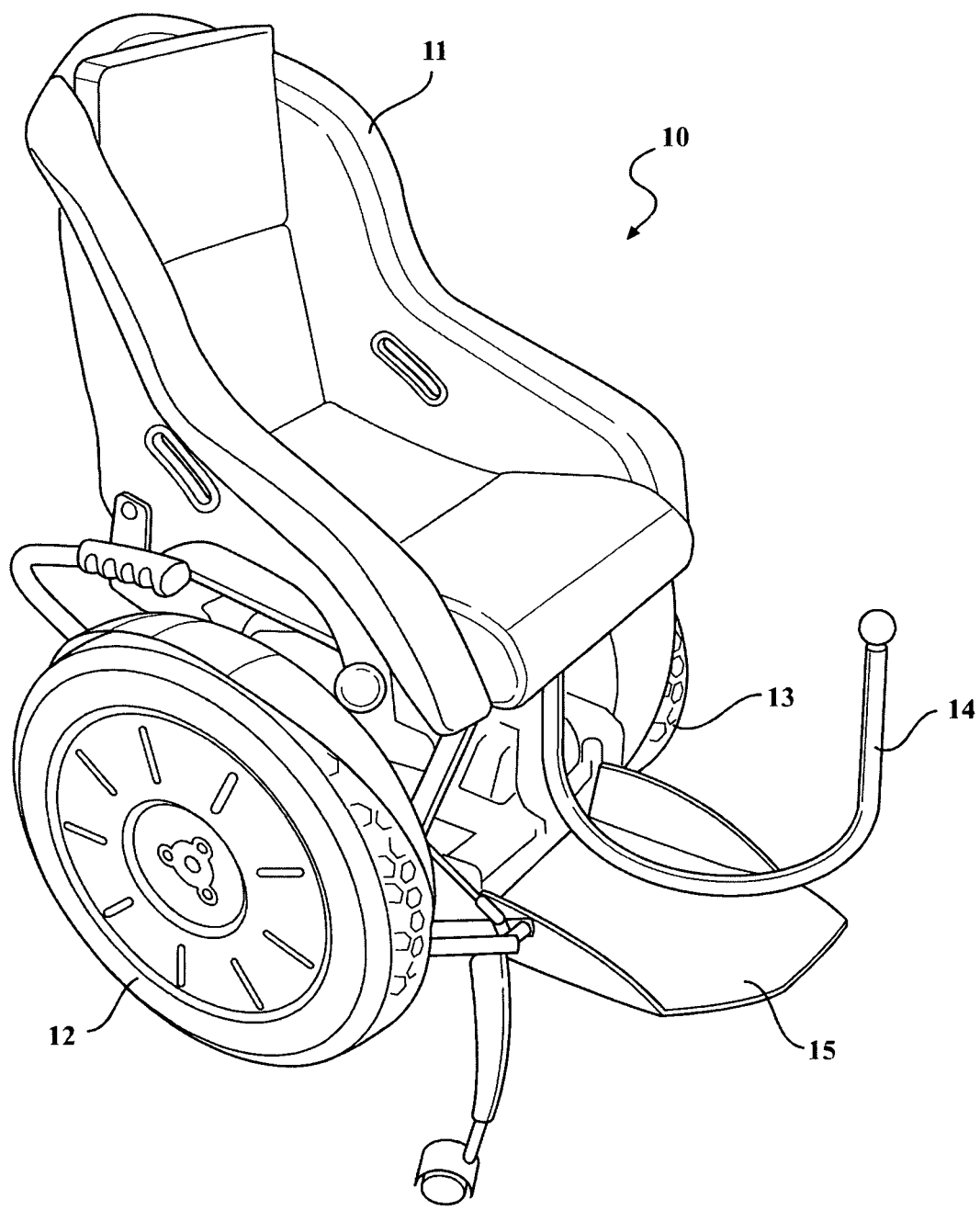
FIG. 1 is a front side perspective view of a powered mobility device in accordance with a preferred embodiment of the invention.
Figure 2:
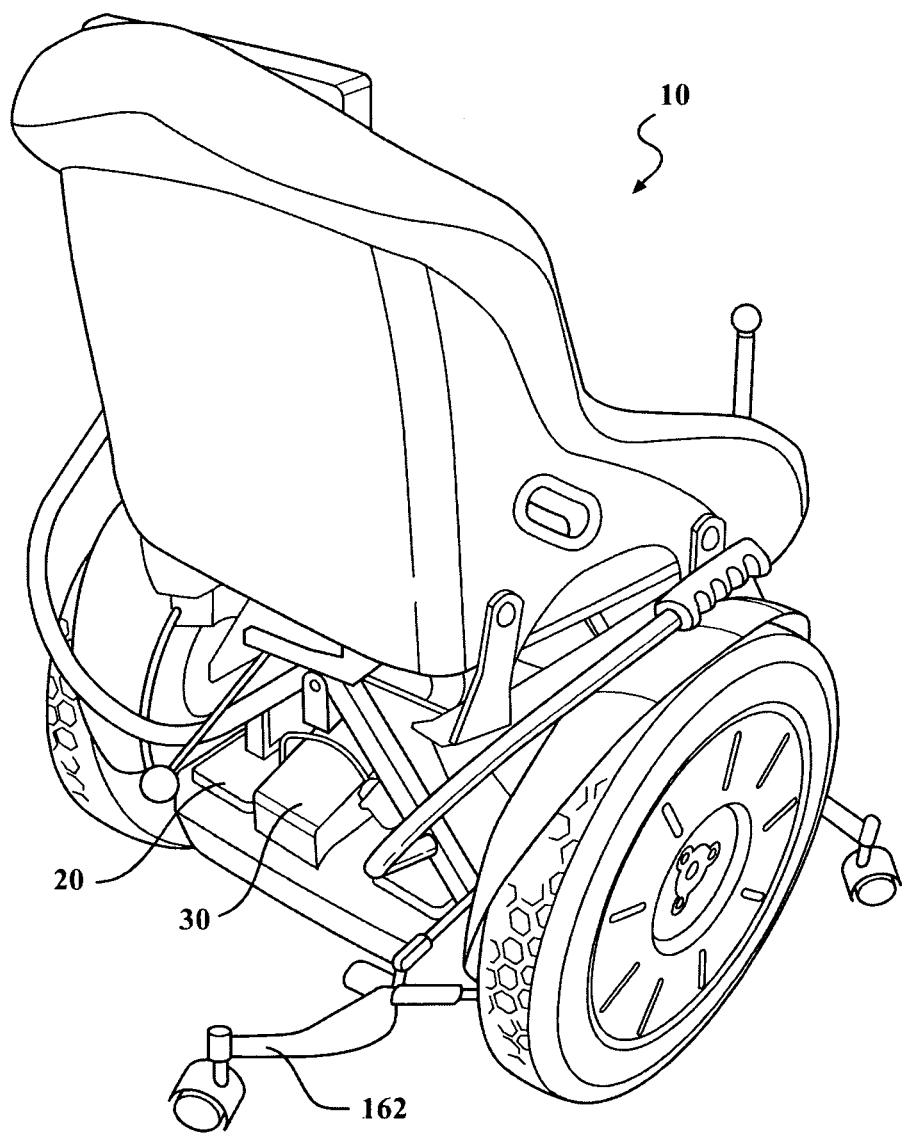
FIG. 2 is a back side perspective view of the powered mobility device as shown in FIG. 1.
Figure 3:
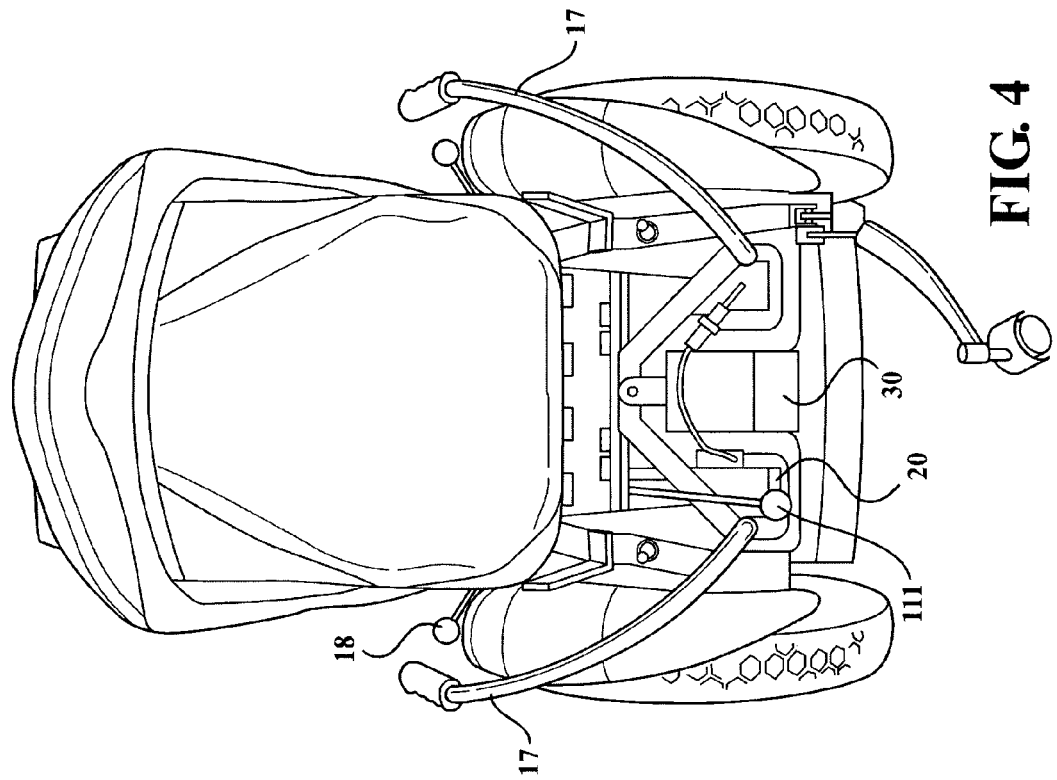
FIG. 3 is a front view of the powered mobility device as shown in FIG. 1.
Figure 4:
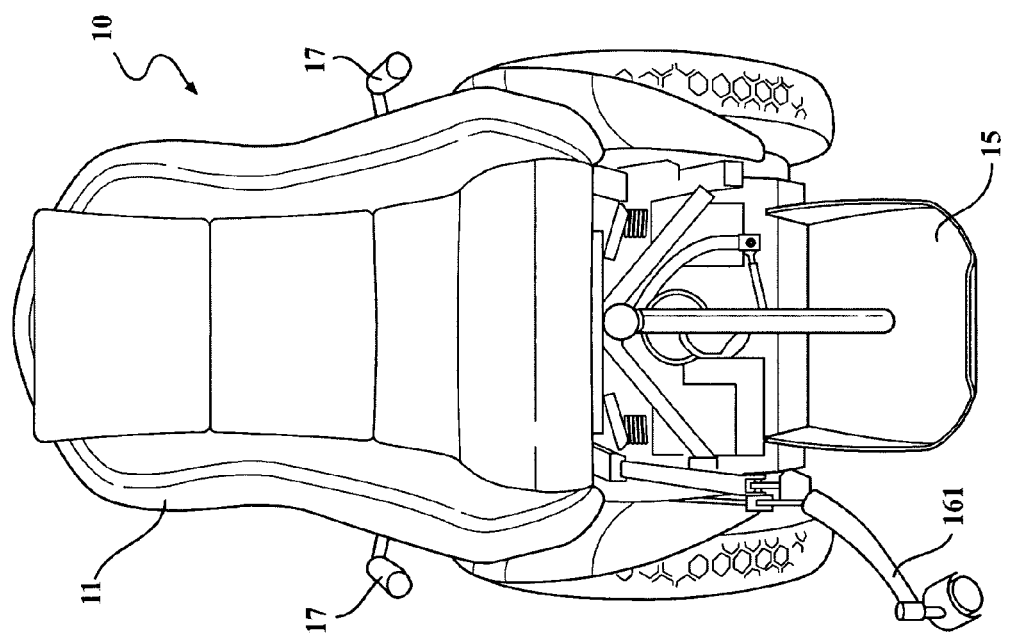
FIG. 4 is a back view of the powered mobility device as shown in FIG. 1.
Figure 5:
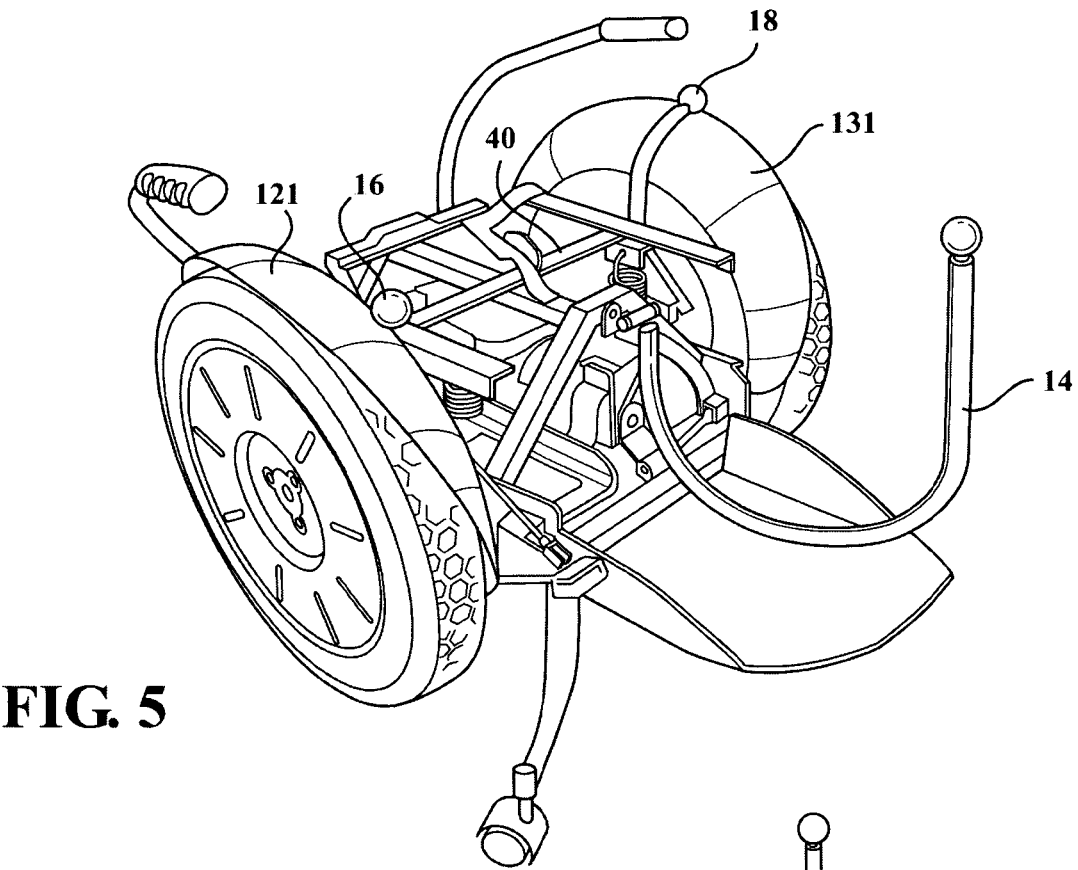
FIG. 5 is a front side perspective view of the powered mobility device (with the seat removed) as shown in FIG. 1.
Figure 6:
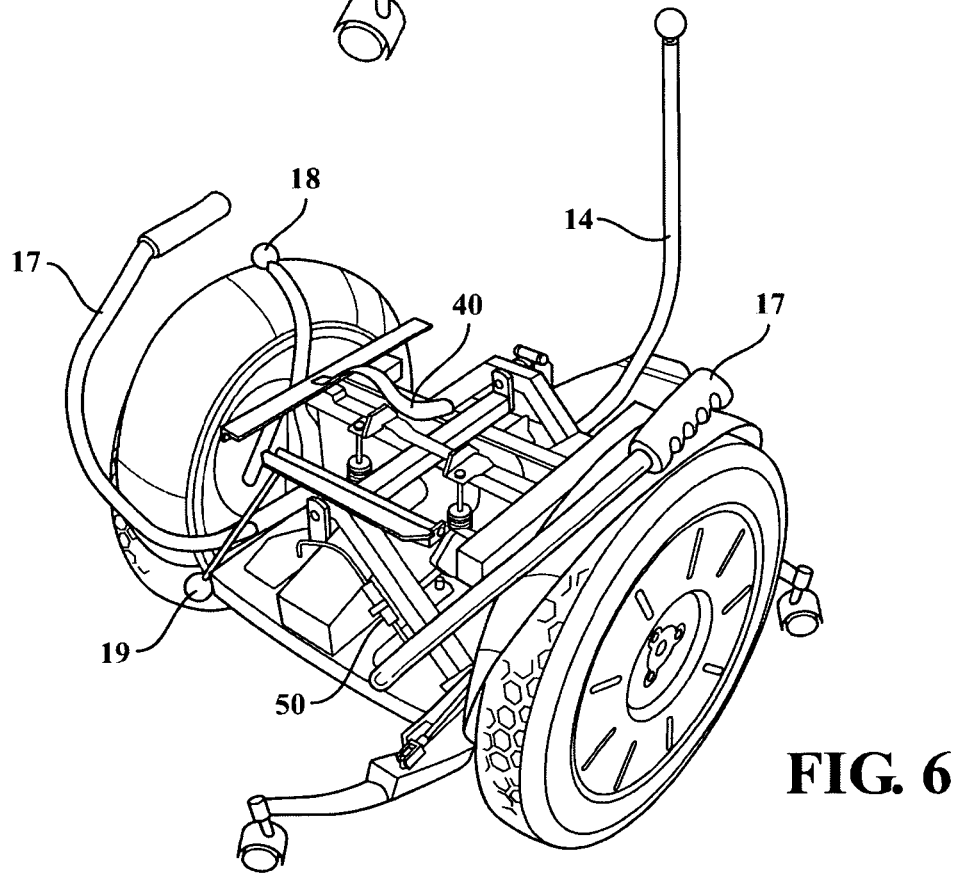
FIG. 6 is a back side perspective view of the powered mobility device (with the seat removed) as shown in FIG. 1.

FIGS. 1 to 4 show differing views of the wheelchair 10 and FIGS. 5 & 6 show the wheelchair 10 with the seat 11 removed.

The wheelchair 10 is a powered wheelchair 10 and is typically powered by electric battery, however other known modes of powering the wheelchair 10 are envisaged.

The wheelchair 10 is able to be driven on road and off-road. The wheelchair 10 is able to be manoeuvred and steered with or without the use of hands. The movement and steering of the wheelchair 10 is able to be undertaken by weight displacement of the user within the seat 11 of the wheelchair 10 without using their hands.

The wheelchair 10 has two wheels 12, 13 mounted to a shaft drivingly connected to a drive motor via a drive transmission. The drive motor is controlled by a drive controller 20. The drive controller 20 is connected to a weight displacement sensing unit 30. The weight displacement sensing unit 30 is connected to a seat tilt mechanism 40. The seat 11 is detachable to the seat tilt mechanism 40. A joystick 14 selectively engages with the tilt mechanism 40 and the weight displacement sensing unit 30 so that when required the joystick 14 is able to disengage and override the steering capability of the tilt mechanism so that the joystick 14 when moved left or right causes the weight displacement sensing unit 30 to cause the drive controller 20 to steer the wheelchair 10 in the desired direction. The joystick 14 provides finer control and steering of the wheelchair 10 than is possible by steering with the tilt mechanism 40.

The seat 11 is mounted to the tilt mechanism 40 so that the seat 11 can be tilted in a forward, direction in order to cause the wheelchair 10 to move forward and can be tilted in a backward direction to move the wheelchair 10 in a reverse direction. The seat 11 is tilted under the action of the user displacing their weight in particular direction they desire the wheelchair to move. The faster the weight displacement the faster the wheelchair will move. Tilting of the seat to the left or to the right enables the wheelchair to be steered e.g. shifting of the users weight to the left would cause the wheelchair 10 to be steered to the left.

The wheelchair 10 includes a variable tilt lock 18 to enable the tilt mechanism to be locked so that the seat is unable to be tilted.

The weight displacement sensing unit 30 upon sensing weight displacement of a user in a forward direction causes the drive controller 20 to impart drive to the wheels such that the wheelchair 10 moves in a forward direction. The weight displacement sensing unit 30 upon sensing weight displacement of a user in a backward direction causes the drive controller 20 to impart drive to the wheels such that the wheelchair 10 moves in a backward direction. The speed of the wheelchair 10 is governed by the rate of forward and backward displaced weight movement of the user in a particular direction. The weight displacement sensing unit 30 uses gyroscopes to sense the weight displacement of a user and includes a biasing system connectable to the tilt mechanism 40. The biasing system has springs located between the tilt mechanism 40 and the weight displacement sensing unit 30. If a user has limited upper body control, these springs provide resistance to return the user to a non tilt position.

An operational lever 19 connected to the weight displacement sensing unit 30 is movable from an off position to an on position such that when lever 19 is in the off position the weight displacement sensing unit 30 is in a non operational state and when the lever 19 moved to an on position the weight displacement sensing unit 30 is an operational state to sense the weight displacement of a user to drive and steer the wheelchair 10.

The degree of turn of the wheelchair 10 is controlled by the degree of left and right movement of the user such that the greater extent of the left or right movement the tighter the left or right turn able to be achieved.

The seat 11 is releasably mounted to the tilt mechanism 40 by a cam locking type arrangement so that the seat 11 is able to be removed when required such as to undertake maintenance or replace the seat with another.

The seat 11 has a seat portion, back portion, left side portion and right side portion. The seat and back portions are separate from the left and right side portions so that the seat and back portion able to move independently relative to the left and side right portions, The left and right side portions are able to be moved laterally so that the width between the left and side portions can be adjusted in order to accommodate different sized users. Also the left and right side portions are removable to allow users to be loaded on to and unloaded from the wheelchair 10. Alternatively, the left and right side portions are pivotally mounted to the seat such that they are able to be rotated upwardly and out of the way so that a user can be loaded on to and unloaded from the wheelchair 10. The seat 11 is inclined in a forward direction.

The wheelchair 10 includes a dampener situated and connected to the tilt mechanism such that the dampener is adapted to control pendulum effects and oversteering effects upon using the wheelchair 10. The dampener is a hydraulic dampener and includes an adjustable valve 50 so that the dampening effect can be increased or decreased.

The wheelchair 10 has foot stands 161, 162 that are able to be raised and lowered such that when in the lowered position the foot stands provide stability to the mobility device when stationary. The forwardly extending foot stand 161 and a rearwardly extending foot stand 162 are connected to a hand lever 16. The foot stands 161, 162 at the distal ends include castor wheels.

The wheelchair 10 includes mudguards 121, 131 extending over and above the wheels 12, 13. The rims of the wheels 12, 13 can includes handgrips such that when desired a user can manoeuvre the mobility device by hand.

Advantages a) A mobility device that is able to operated by the user only
b) A mobility device that is easily manoeuvrable
c) A mobility device that has dual steering functionality
d) A mobility device having variable locking functionality to vary and lock the seat from tilting
e) A mobility device having optional hands steering control
f) A mobility device having sway control
g) A mobility device that is able to used "off road"

Variations

While the invention has been described with reference to an exemplary embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

The invention claimed is:

1. A powered mobility device including two wheeled powered wheel chair that is able to be steered with or without the use of hands, wherein the powered mobility device includes:
   (i) two drive wheels mounted on a shaft;
   (ii) a drive control means drivingly coupled to the shaft;
   (iii) a tiltable seat such that the seat is adapted to tilt in a forward, backward, left and right directions as a result of a user shifting their body weight in either of those directions., the seat is mounted to a tilt mechanism such that the seat is able to tilt in a forward, backward, left and right directions as a result of the user shifting their body weight in either of those directions, the tilt mechanism includes at least primary and secondary pivots, where the primary pivot is mounted to the shaft so as to allow the tilt mechanism to tilt the seat in a forward and backward direction, and the secondary pivot is spaced a distance above the primary pivot so that the secondary pivot is situated between the seat and the shaft such that the secondary pivot allows the seat to tilt back or forward about the secondary pivot so as to enhance the offset of weight transfer so as to cause increased control of the back or forward tilt of the seat relative to the shaft;

(iv) a weight displacement sensing means connectable to the tilt mechanism and the drive control means such that upon sensing a weight displacement of a user in a particular direction the weight displacement sensing means causes the drive control means to impart drive to the drive wheels to move the mobility device in the direction of the sensed displaced weight of the user so that the mobility device is able to be driven in a forward and backward direction and steered in a left or right direction;

(v) a tilt locking means adapted to selectively lock the tilt mechanism, the tilt locking mechanism includes a hydraulic system connected to the tilt mechanism, the hydraulic system incorporates a line locker to lock the movement of the seat in the right and left directions when the hydraulic system is activated; and (vi) a hand control means selectively engageable the weight displacement sensing means such that when the tilt locking means is activated steering control in the left and right directions is transferred from the tilt mechanism to the hand control means such that hand control means when moved left or right causes the weight displacement sensing means to cause the drive control means to steer the mobility device in a desired direction.

2. The powered mobility device as claimed in claim 1, wherein the mobility device has only two wheels.

3. The powered mobility device as claimed in claim 2, wherein the weight displacement sensing means upon sensing weight displacement in a forward direction is adapted to cause the drive control means to impart drive to the wheels such that the mobility device moves in a forward direction.

4. The powered mobility device as claimed in claim 3, wherein the weight displacement sensing means upon sensing weight displacement in a backward direction is adapted to cause the drive control means to impart drive to the wheels such that the mobility device moves in a backward direction.

5. The powered mobility device as as set forth in claim 4, wherein the speed of the mobility device is controlled by the forward and backward movement of the user and is dependent upon the greater rate of the shift of displaced weight sensed in a particular direction.

6. The powered mobility device as set forth in claim 5, wherein the weight displacement sensing means upon sensing movement of the user or the hand control means in a left direction causes the drive control means to steer the mobility device to the left.

7. The powered mobility device as set forth in claim 6, wherein the weight displacement sensing means upon sensing movement of the user or the hand control means in a right direction causes the drive control means to steer the mobility device to the right.

8. The powered mobility device as set forth in claim 7, wherein the degree of turn of the mobility device is controlled by the degree of left and right movement of the user such that the greater extent of the left or right movement sensed by the weight displacement sensing means the tighter the left or right able to be achieved.

9. The powered mobility device as set forth in claim 8, wherein the seat is releasably mounted to the tilt mechanism by a mounting means such that the seat is able to be removed when required in order to undertake maintenance of the mobility device or replace the seat with another.

10. The powered mobility device as claimed in claim 9, wherein the mounting means is of a cam locking type arrangement such that a cam member is able to rotate so that cam member is able to be rotated to engage or disengage with a portion of the tilt mechanism such that when in the engaged position the cam member by engaging with the tilt mechanism secures and locks the seat to the tilt mechanism.

11. The powered mobility device as set forth in claim 10, wherein the seat has a seat portion, back portion, left side portion and right side portion.

12. The powered mobility device as claimed in claim 11, wherein the seat and back portion are separate from the left and right side portions such that the seat and back portion is adapted to move independently relative to the left and side right portion.

13. The powered mobility device as claimed in claim 12, wherein the left and right side portions are adapted to be moved laterally so that the width between the left and right side portions can be adjusted in order to accommodate different sized users.

14. The powered mobility device as set forth in claim 13, wherein the left and right side portions are adapted to be removed so that users are able to be easily loaded on to and unloaded from the mobility device and also allow for easy transport of the wheelchair.

15. The powered mobility device as set forth in claim 14, wherein the left and right side portions are pivotally mounted to the seat such that they are able to be rotated upwardly and out of the way so that a user can be loaded on to and unloaded from the mobility device.

16. The powered mobility device as set forth in claim 15, wherein the left and right side portions include armrests.

17. The powered mobility device as set forth in claim 16, wherein the seat is inclined in a forward direction.

18. The powered mobility device as set forth in claim 17, wherein the mobility device includes a dampener situated and connected to the tilt mechanism such that the dampener is adapted to control pendulum effects and oversteering effects upon using the mobility device.

19. The powered mobility device as claimed in claim 18, wherein the dampener is a hydraulic dampener.

20. The powered mobility device as claimed in claim 19, wherein the dampener includes an adjustable valve so that the dampening effect can be increased or decreased.

21. The powered mobility device as set forth in claim 20, wherein the mobility device includes foot stands that are able to be raised and lowered such that when in the lowered position the foot stands provide stability to the mobility device of when stationary.

22. The powered mobility device as claimed in claim 21, wherein the foot stands at the distal ends include castor wheels.

23. : The powered mobility device as claimed in claim 21, wherein there is a forwardly extending foot stand and a rearwardly extending foot stand, each foot stand being connected to a hand lever.

24. The powered mobility device as set forth in claim 23, wherein the hand control means is a joystick that extends forwardly in front of the seat such that a user is able to, when desired, control the steering of the mobility device by hand.

25. The powered mobility device as claimed in claim 24, wherein the joystick is releaseably engageable with the tilt mechanism and the weight displacement sensing means such that when the joystick is pulled upwards and towards a user in the seat the joystick is adapted to disengage the tilt mechanism from the weight displacement sensing means so that the joystick when moved left or right is able to steer the mobility device in the desired direction.

26. The powered mobility device as claimed in claims 25, wherein the joystick is adapted to provide finer control and steering of the mobility device than is possible by steering with the tilt mechanism.

27. The powered mobility device as set forth in claim 26, wherein the mobility device includes mudguards extending over and above the wheels.

28. The powered mobility device as set forth in claim 27, wherein the rims of the wheels includes handgrips such that when desired a user can manoeuvre the mobility device by hand.

29. The powered mobility device as set forth in claim 28, wherein the mobility device is a wheelchair.

30. The powered mobility device as claimed in claim 29, wherein the mobility device is a two wheeled wheelchair.

* * * * *